United States Patent Office 3,511,603
Patented May 12, 1970

3,511,603
PREPARATION OF HYDROGEN FLUORIDE
Carl L. Yaws, Baton Rouge, La., assignor to Ethyl Corporation, New York, N.Y., a corporation of Virginia
No Drawing. Filed Dec. 27, 1967, Ser. No. 693,723
Int. Cl. C01b 7/22, 11/24, 33/00
U.S. Cl. 23—153                                       3 Claims

ABSTRACT OF THE DISCLOSURE

A process for producing hydrogen fluoride from aqueous fluosilicic acid by decomposing the fluosilicic acid to aqueous hydrogen fluoride and silicon tetrafluoride; fluorinating metal oxide to metal fluoride with the aqueous hydrogen fluoride; hydrolyzing the silicon tetrafluoride to fluosilicic acid for recycle; defluorinating the metal fluoride to anhydrous hydrogen fluoride and metal oxide for recycle.

BACKGROUND OF THE INVENTION

One of the most important problems confronting the fluorochemicals industry today is the economical production of anhydrous hydrogen fluoride from aqueous fluosilicic acid. Mere decomposition of aqueous fluosilicic acid by flash vaporization produces aqueous hydrogen fluoride. When a solution of hydrogen fluoride and water at a concentration greater than 37 percent is fractionated, anhydrous hydrogen fluoride is produced and the residue is an azeotrope containing 37 percent hydrogen fluoride. Loss of such a high percentage of hydrogen fluoride in the azeotrope is of course intolerable.

A known method of recovering hydrogen fluoride from its azeotrope with water is by the process of addition of a third component which takes up the hydrogen fluoride. Subsequent treatment to regenerate the hydrogen fluoride usually results in the decomposition and loss of the third component. Thus, this method is quite expensive and generally uneconomical.

The present invention avoids the substantially uneconomical procedure of the prior art by providing a third component which takes up the hydrogen fluoride, but is not subsequently lost or destroyed upon treatment to regenerate the hydrogen fluoride.

SUMMARY

This invention provides a process for preparing hydrogen fluoride from fluosilicic acid comprising in combination the steps of vaporizing an aqueous solution of fluosilicic acid to produce a mixture of hydrogen fluoride, silicon tetrafluoride, and water; passing said mixture into a bed of metal oxide to produce metal fluoride and more water; withdrawing said silicon tetrafluoride from said bed and defluorinating said metal fluoride to produce metal oxide and hydrogen fluoride.

DESCRIPTION OF THE PREFERRED EMBODIMENTS

The integrated process of the present invention may be practiced with economy and efficiency according to the following reactions wherein M is iron, copper, nickel or chromium and $a$, $b$, $c$ and $d$ are whole integers of from 0 to 3 which may be the same or different:

(1) Decomposition:

$$H_2SiF_6(Aq.) \rightarrow 2HF\uparrow + SiF_4\uparrow + H_2O\uparrow$$

(2) Fluorination:

$$6HF + M_aO_b \rightarrow 2M_cF_d\downarrow + 3H_2O\uparrow$$

(3) Hydrolysis:

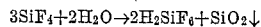

(4) Defluorination:

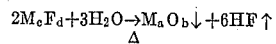

The decomposition reaction, supra, may be conveniently practiced by flash vaporizing aqueous fluosilicic acid at a temperature within the range of from about 200° F. to about 650° F.; a temperature of 200° F. to 400° F. is more preferred. Preferably, a fluosilicic acid feed tank is provided which is rubber lined mild steel, while the flash vaporization chamber is constructed of graphite material. Inasmuch as the silicon tetrafluoride and water produced by the decomposition reaction are in vapor form, they do not react.

The fluorination reaction, supra, wherein metal oxide is contacted with the aqueous hydrogen fluoride from the first reaction, is conducted at a temperature within the range of about 200° F. to about 650° F.; a more preferred temperature range is about 200° F. to about 400° F. A fluorination reactor is provided which is preferably carbon lined mild steel. The flashed vapor from the decomposition reaction is preferably contacted with solid metal oxide particles which may be contained in the form of a fluidized bed, packed bed, or other means.

The hydrolysis reaction, supra, is conducted in order to recover fluosilicic acid for recycle. Inasmuch as the silicon tetrafluoride and water from the fluorination reaction are still in the vapor phase, no reaction occurs therebetween. In the hydrolysis reaction the silicon tetrafluoride is contacted with liquid water. This results in the precipitation of fine particle silicon dioxide. The solid silicon dioxide is removed by filtration, and the aqueous fluosilicic acid is recycled. It is preferred that a filtration centrifuge be used which is constructed of Monel or nickel clad mild steel.

The defluorination reaction, supra, is conducted in order to recover metal oxide for recycle. According to this reaction, the metal fluoride is contacted with steam at a relatively high temperature within the range of about 800° F. to about 1700° F.; a more preferred range is from about 900° F. to about 1600° F. The amount of steam is carefully controlled in this reaction so that substantially anhydrous hydrogen fluoride is recovered as a vapor, while the metal oxide remains as a solid. This reaction may likewise be conducted in a fluidized bed, packed bed or similar means. A good source of water for the reaction is that contained in combustion products from burning natural gas or other fuels, although other sources may be used. Nickel lined mild steel is preferred as a construction material for the defluorination reactor.

The above four reactions of the present process lend themselves to either a continuous or batch operation. Thus, fluosilicic acid may be continuously formed in reaction 3 and recycled to reaction 1; likewise metal oxide may be continuously regenerated in reaction 4 and recycled for use in reaction 2. In a preferred embodiment, metal fluoride is continuously removed from a fluidized bed within which reaction 2 is conducted and transferred to a fluidized bed within which reaction 4 is conducted. Simultaneously, metal oxide is continuously removed from the latter bed and transferred to the former bed.

The process may be advantageously conducted at pressures above atmospheric whereby better hydrogen fluoride conversions are achieved. Pressures below atmospheric are less desirable.

In order that those skilled in the art can thus appreciate the process of this invention, the following examples are given by way of description and not by way of limitation.

Example I 25 weight percent fluosilicic acid is passed from a rubber lined mild steel feed tank to a flash vaporization chamber constructed of graphite material. The fluosilicic acid is vaporized at a temperature of 250° F. to produce a mixture of 6.94 weight percent hydrogen fluoride, 18.06 weight percent silicon tetrafluoride and 75 percent water. This mixture is passed into a fluidized bed of iron oxide at 250° F. and 2 atmospheres absolute pressure to produce iron fluoride and water. 92 percent hydrogen fluoride conversion is obtained. Silicon tetrafluoride and water are removed from the bed of iron oxide. The silicon tetrafluoride is then contacted in another reaction zone with liquid water to produce hydrogen fluoride and silicon dioxide. The silicon dioxide is extracted in a filtration centrifuge of Monel clad on mild steel. The fluosilicic acid is recycled to the fluosilicic feed tank. The iron fluoride is passed to a defluorination reactor constructed of nickel lined mild steel. At a temperature of 1000° F. the iron fluoride is converted to iron oxide which is recycled to the fluorination bed and vaporous anhydrous hydrogen fluoride which is recovered as product.

Example II

Example I is repeated except the fluorsilicic acid is vaporized at 300° F., the fluidized bed is operated at 300° F. to obtain 81 percent hydrogen fluoride and the iron fluoride is defluorinated at 900° F.

Example III

Example I is repeated at 1 atmosphere absolute pressure whereby 89 percent hydrogen fluoride conversion is achieved.

Example IV

Example I is repeated at 4 atmospheres absolute pressure whereby 95 percent hydrogen fluoride conversion is achieved.

Example V

The mixture vaporized from fluosilicic acid in Example I is passed into a fluidized bed of copper oxide at 330° F. and 2 atmospheres absolute pressure to produce copper fluoride and water. 87 percent hydrogen fluoride conversion is obtained. Silicon tetrafluoride and water are removed from the bed of copper oxide. The silicon tetrafluoride is then contacted in another reaction zone with liquid water to produce hydrogen fluoride and silicon dioxide. The silicon dioxide is extracted in a filtration centrifuge of Monel clad on mild steel. The fluosilicic acid is recycled to the fluosilicic feed tank. The copper fluoride is passed to a defluorination reactor constructed of nickel lined mild steel. At a temperature of 1020° F. the copper fluoride is converted to copper oxide which is recycled to the fluorination bed and vaporous anhydrous hydrogen fluoride which is recovered as product.

Example VI

Example V is repeated at 1 atmosphere absolute pressure whereby 83 percent hydrogen fluoride conversion is achieved.

Example VII

Example V is repeated at 4 atmospheres absolute pressure whereby 92 percent hydrogen fluoride conversion is achieved.

Example VIII

The mixture vaporized from fluosilicic acid in Example I is passed into a fluidized bed of chromium oxide at 330° F. to produce chromium fluoride and water. Silicon tetrafluoride and water are removed from the bed of chromium oxide. The silicon tetrafluoride is then contacted in another reaction zone with liquid water to produce hydrogen fluoride and silicon dioxide. The silicon dioxide is extracted in a filtration centrifuge of Monel clad on mild steel. The fluosilicic acid is recycled to the fluosilicic feed tank. The chromium fluoride is passed to a defluorination reactor constructed of nickel lined mild steel. At a temperature of 1200° F. the chromium fluoride is converted to chromium oxide which is recycled to the fluorination bed and vaporous anhydrous hydrogen fluoride which is recovered as product.

Example IX

The mixture vaporized from fluosilicic acid in Example I is passed into a fluidized bed of nickel oxide at 330° F. and 1 atmosphere absolute pressure to produce nickel fluoride and water. 98 percent hydrogen fluoride conversion is obtained. Silicon tetrafluoride and water are removed from the bed of nickel oxide. The silicon tetrafluoride is then contacted in another reaction zone with liquid water to produce hydrogen fluoride and silicon dioxide. The silicon dioxide is extracted in a filtration centrifuge of Monel clad on mild steel. The fluosilicic acid is recycled to the fluosilicic feed tank. The nickel fluoride is passed to a defluorination reactor constructed of nickel lined mild steel. At a temperature of 1550° F. the nickel fluoride is converted to nickel oxide which is recycled to the fluorination bed and vaporous anhydrous hydrogen fluoride which is recovered as product.

Example X

Example IX is repeated at 640° F. fluidized bed temperature and 1 atmosphere obslute pressure. 90 percent hydrogen fluoride conversion is achieved.

Example XI

Example X is repeated at 4 atmospheres absolute pressure whereby 96 percent hydrogen fluoride conversion is achieved.

It is to be understood that the invention is not limited by the specific examples and embodiments described hereinabove, but includes such changes and modifications as may be apparent to one skilled in the art upon reading the appended claims.

I claim:

1. A continuous process for the preparation of anhydrous hydrogen fluoride from aqueous fluosilicic acid comprising in combination the steps of:
    (a) vaporizing said aqueous fluosilicic acid at a temperature within the range of from about 200° F. to about 650° F. to produce a vaporized mixture of hydrogen fluoride, silicon tetrafluoride and steam,
    (b) passing the vaporized mixture into a bed of solid metal oxide particles at a temperature of about 200° F. to about 650° F. to produce by reaction the solid fluoride of said metal and more steam, said steam and said silicon tetrafluoride being withdrawn from said bed,
    (c) contacting the metal fluoride with a controlled quantity of steam at a temperature of from about 800° F. to about 1700° F. to produce anhydrous hydrogen fluoride and to regenerate the metal oxide and utilizing said metal oxide in said bed in step (b),
    (d) contacting the said silicon tetrafluoride being withdrawn from said bed in step (b) with liquid water to produce an aqueous fluosilicic acid solution containing solid particles of silicon dioxide, separating the aqueous fluosilicic acid solution from said solid particle of silicon dioxide and recycling same to step (a) for vaporization.

2. The process of claim 1 wherein the first contacting step occurs in a fluidized bed and metal fluoride is continuously removed therefrom and replaced with metal oxide.

3. The process of claim 1 wherein said metal oxide is selected from the group consisting of iron oxide, copper oxide, nickel oxide, and chromium oxide.

References Cited

UNITED STATES PATENTS

| | | | |
|---|---|---|---|
| 1,938,533 | 12/1933 | Penfield | 23—153 |
| 2,636,806 | 4/1953 | Winter | 23—153 XR |
| 2,686,151 | 8/1954 | Feldbauer, et al. | 23—153 XR |

(Other references on following page)

UNITED STATES PATENTS

| | | | |
|---|---|---|---|
| 2,919,174 | 12/1959 | Pring | 23—153 XR |
| 3,065,050 | 11/1962 | Baeumert | 23—153 XR |
| 3,107,148 | 10/1963 | Brooks | 23—153 |
| 3,198,600 | 8/1965 | Mollard et al. | 23—153 XR |
| 3,218,129 | 11/1965 | Barker et al. | 23—153 |
| 3,233,969 | 2/1966 | Heller et al. | 23—153 XR |
| 3,273,963 | 9/1966 | Gunn | 23—153 XR |
| 3,278,266 | 10/1966 | Welch et al. | 23—153 XR |

OTHER REFERENCES

J. W. Mellor: "A Comprehensive Treaties on Inorganic and Theoretical Chemistry," vol. 3 (1923 ed.), p. 154; vol. 6 (1925 ed.), p. 939; vol. 11 (1931 ed.), p. 362; vol. 15 (1936 ed.), pp. 402–403, Longmans, Green & Co., New York.

AEC-tr-3927 (part I)—"The Chemistry of Fluorine and Its Inogranic Compounds," I. G. Ryss, p. 330, Moscow, 1956.

EDWARD STERN, Primary Examiner

U.S. Cl. X.R.

23—88, 139, 145, 148, 183, 200, 205